United States Patent
Seo et al.

(10) Patent No.: US 12,420,790 B2
(45) Date of Patent: Sep. 23, 2025

(54) VEHICLE CONTROL SYSTEM AND VEHICLE CONTROL METHOD FOR LIMITING SPEED OF VEHICLE BASED ON TIRE CODES

(71) Applicants: Hyundai Motor Company, Seoul (KR); Kia Corporation, Seoul (KR)

(72) Inventors: Jeong In Seo, Gyeonggi-do (KR); Myoung Kyu Seo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/538,173

(22) Filed: Dec. 13, 2023

(65) Prior Publication Data
US 2025/0050879 A1    Feb. 13, 2025

(30) Foreign Application Priority Data
Aug. 11, 2023  (KR) .......... 10-2023-0105350

(51) Int. Cl.
*B60W 30/14*    (2006.01)
*B60C 23/00*    (2006.01)
*B60W 50/16*    (2020.01)

(52) U.S. Cl.
CPC .......... *B60W 30/146* (2013.01); *B60W 50/16* (2013.01); *B60C 23/001* (2013.01); *B60W 2530/20* (2013.01); *B60W 2756/10* (2020.02)

(58) Field of Classification Search
CPC .............. B60W 30/146; B60W 50/16; B60W 2530/20; B60W 2756/10; B60C 23/001
See application file for complete search history.

(56) References Cited

U.S. PATENT DOCUMENTS

| | | | |
|---|---|---|---|
| 6,748,799 B2 * | 6/2004 | Fischer | B60C 23/0408 73/146 |
| 2014/0195068 A1 * | 7/2014 | Boss | G08G 1/096775 701/1 |
| 2014/0368327 A1 * | 12/2014 | Darrer | G06K 19/0708 340/447 |
| 2016/0347134 A1 * | 12/2016 | Choi | G01L 5/00 |
| 2017/0355234 A1 * | 12/2017 | Dharamshi | B60C 23/0408 |
| 2019/0256143 A1 * | 8/2019 | Lavoie | B60C 23/0479 |
| 2021/0179103 A1 * | 6/2021 | Kowalchuk | B60W 50/14 |
| 2021/0181063 A1 * | 6/2021 | Dodani | B60C 23/0401 |
| 2023/0373251 A1 * | 11/2023 | Duchemin | B60C 9/02 |
| 2024/0132053 A1 * | 4/2024 | De Pinto | B60W 40/112 |

* cited by examiner

*Primary Examiner* — Thomas E Worden
*Assistant Examiner* — Madison B Emmett
(74) *Attorney, Agent, or Firm* — Fox Rothschild LLP

(57) ABSTRACT

A vehicle control system includes a storage unit configured to store tire code information including a load index and a speed symbol, a detector configured to collect and detect state information on the vehicle including vehicle weight, vehicle speed, tire pressure of tires of the vehicle, and camber angle, and a controller configured to determine, based on the tire code information and the state information, suitability of the tires, and to control a maximum possible travelling speed of the vehicle.

20 Claims, 3 Drawing Sheets

VEHICLE CONTROL SYSTEM AND VEHICLE CONTROL METHOD FOR LIMITING SPEED OF VEHICLE BASED ON TIRE CODES

CROSS-REFERENCE TO RELATED APPLICATION(S)

This application claims under 35 U.S.C. § 119 (a) the benefit of Korean Patent Application No. 10-2023-0105350 filed on Aug. 11, 2023 in the Korean Intellectual Property Office, the entire contents of which are incorporated herein by reference.

BACKGROUND

(a) Technical Field

The present disclosure relates to a vehicle control system and a vehicle control method for limiting a speed of a vehicle based on tire codes, more particularly, to the vehicle control system and method for determining, based on the tire codes, suitability of tires of the vehicle and a maximum speed of the vehicle.

(b) Description of the Related Art

A vehicle is equipped with tires that rotate while being coupled to wheels, where the tires are configured to transmit driving force generated by an engine of the vehicle and braking force of brakes to a road surface, allowing the vehicle to travel, and the tires are also configured to absorb bumps, shocks, and other impacts transmitted from the road surface while the vehicle is travelling.

Tire codes vary depending on a vehicle, and tire codes related to size, performance, and construction of a tire are indicated on a sidewall of a tire. Tire codes include information on a cross-sectional width, aspect ratio, construction, rim outer diameter, load index, and speed symbol of a tire. In particular, the load index and speed symbol determine a weight and speed of the vehicle that the tire is capable of bearing.

Drivers are rarely aware of the requirements of weight and speed of a vehicle according to a load index and speed symbol of a tire. When purchasing and using a vehicle produced by an automobile manufacturer, there is no problem related to replacing tires because the tires are designed to fit the vehicle and guidance thereon is provided via a manual. However, when tire codes change when the tires are replaced due to wear or damage, it may be difficult for a driver to determine suitability of tires the vehicle according to the changed tire codes.

SUMMARY

An aspect of the present disclosure provides a vehicle control system and a vehicle control method for limiting a speed of a vehicle, in particular, determining suitability of tires of the vehicle and controlling the speed of the vehicle based on codes of a tire mounted on the vehicle, so as to ensure safe travel of the vehicle in consideration of tire codes and a current state of the vehicle.

According to an aspect of the present disclosure, there is provided a vehicle control system for controlling a speed of a vehicle, the vehicle control system including a storage unit configured to store tire code information including a load index and a speed symbol, a detector configured to collect and detect state information on the vehicle including vehicle weight, vehicle speed, tire pressure, and camber angle, and a controller configured to determine, based on the tire code information and the state information, suitability of tires of the vehicle, and to control a maximum possible travelling speed of the vehicle.

The vehicle control system may further include an output unit configured to output control information by the controller. The controller may be configured to guide, via the output unit, a driver about a speed limit for the vehicle and that an operation of controlling the vehicle speed to the speed limit is performed.

The output unit may include at least one of a display unit, a sound output unit, and a vibration output unit.

The controller may be configured to calculate, based on the load index and the tire pressure, an allowable load of the tire, and to determine suitability of tires of the vehicle by comparing the vehicle weight and the allowable load to each other.

The controller may be configured to limit the maximum possible travelling speed of the vehicle limited to a preset first speed limit when the vehicle weight exceeds the allowable load.

The controller may be configured to determine, based on a difference value between the vehicle weight and the allowable load, the first speed limit when the vehicle weight exceeds the allowable load.

The controller may be configured to calculate the allowable load by summing load information on each of a plurality of tires. The load information on each of the plurality of tires may be determined based on the load index and the tire pressure of each of the plurality of tires.

The storage unit may be configured to accumulate and store a maximum travelling speed reached while the vehicle is travelling. The controller may be configured to limit the maximum possible travelling speed of the vehicle to a predetermined speed, based on the speed symbol and the maximum travelling speed.

The controller may be configured to calculate, based on the speed symbol, an allowable speed of the tire, and to limit the maximum possible travelling speed of the vehicle to the allowable speed of the tire when the maximum travelling speed exceeds the allowable speed.

The controller may be configured to calculate, based on the tire code information, the maximum travelling speed, and the camber angle, a minimum required pressure of the tire considering the camber angle, and to determine suitability of tires of the vehicle by comparing the tire pressure and the minimum required pressure to each other.

The controller may be configured to calculate, based on the minimum required pressure, a second speed limit, and to limit the maximum possible travelling speed of the vehicle to the calculated second speed limit when the tire pressure is less than the minimum required pressure.

The vehicle control system may further include a communicator configured to perform internal communication of the vehicle and communication between the vehicle and an external device. The tire code information may be input to the external device. The storage unit may be configured to receive, from the external device, the tire code information via the communicator.

A vehicle may include the above-described vehicle control system.

According to another aspect of the present disclosure, there is provided a vehicle control method for controlling a speed of a vehicle, the vehicle control method including inputting and storing tire code information including a load index and a speed symbol, collecting and detecting state information on the vehicle including vehicle weight, vehicle speed, tire pressure, and camber angle, and determining, based on the tire code information and the state information, suitability of tires of the vehicle, and controlling a maximum possible travelling speed of the vehicle.

The vehicle control method may further include calculating, based on the load index and the tire pressure, an allowable load of the tire, and comparing the vehicle weight and the allowable load to each other, and limiting the maximum possible travelling speed of the vehicle to a preset first speed limit when the vehicle weight exceeds the allowable load.

The vehicle control method may further include detecting a maximum travelling speed reached while the vehicle is travelling, calculating, based on the speed symbol, an allowable speed of the tire, and comparing the maximum travelling speed and the allowable speed to each other, and limiting the maximum possible travelling speed of the vehicle to the allowable speed when the maximum travelling speed exceeds the allowable speed.

The vehicle control method may further include detecting a maximum travelling speed reached while the vehicle is travelling, calculating, based on the tire code information, the maximum travelling speed, and the camber angle, a minimum required pressure of the tire considering the camber angle, comparing the tire pressure and the minimum required pressure to each other, and calculating, based on the minimum required pressure, a second speed limit when the tire pressure is less than the minimum required pressure, and limiting the maximum possible travelling speed of the vehicle to the calculated second speed limit.

According to an example embodiment of the present disclosure, travelling safety of a vehicle may be secured by determining, based on codes of a tire mounted on the vehicle, whether a weight of the vehicle, a speed of the vehicle, and a tire pressure are suitable for travelling, and controlling the speed of the vehicle to a predetermined speed limit.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
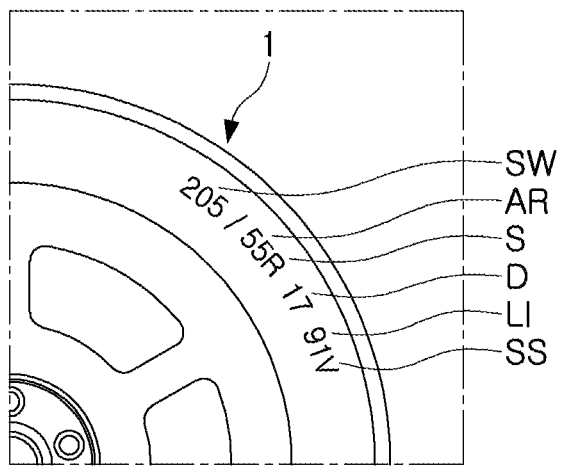
FIG. 1 is a diagram illustrating a tire according to an example embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various modifications may be made to the example embodiments. Here, the example embodiments are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as having an ideal or excessively formal meaning, unless otherwise defined herein.

Hereinafter, example embodiments of the present disclosure will be described with reference to the accompanying drawings.

FIG. 1 is a diagram illustrating a tire 1 according to an example embodiment of the present disclosure.

The tire 1 according to an example embodiment of the present disclosure may be a vehicle tire applied to a vehicle. Here, the vehicle refers to various vehicles transporting a transported object such as a person, animal, or object from a starting point to a destination. Such vehicles are not limited to vehicles travelling on roads or tracks.

Referring to FIG. 1, the tire 1 may have tire codes indicated on an outer surface thereof such that information on the tire 1 is identified. For example, the tire codes may be indicated on a sidewall portion of the tire 1.

The tire codes may include information on a cross-sectional width (SW), an aspect ratio (AR), a structural symbol(S), a rim outer diameter (D), a load index (LI), and a speed symbol (SS) of the tire 1. However, information indicated on the tire 1 is not limited to the above-described examples, and may further include a manufacturing date and a maximum pressure index.

As illustrated in FIG. 1, the tire 1, having tire codes indicated as "205/55R 17 91V," may be a radial tire and have a cross-sectional width (SW) of 205 mm, an aspect ratio (AR) of 55%, a rim outer diameter (D) (or wheel diameter) of 17 inches, a load index (LI) of 91, and a speed symbol (SS) of V.

Here, the load index (LI) may be indicated as a numerical code of a maximum load that a tire is capable of carrying, and the speed symbol (SS) may be indicated as an alphabet code of a maximum speed at which the tire is capable of travelling. The maximum load (for example, allowable load) and the maximum speed (for example, allowable speed) according to the load index (LI) and speed symbol (SS) may be predetermined according to tire standards (for example, European Tire and Rim Technical Organization (ETRTO) standards in Europe, Tire and Rim Association (TRA) standards in North America, or Japan Automobile Tire Manufacturers Association (JATMA) in Japan).

The tire 1 illustrated in FIG. 1 may have tire codes indicated according to the ETRTO standards. For example, the load index (LI) of 91 may mean that each tire 1 is capable of bearing a load of 615 kg, and the speed symbol (SS) of V may mean that a vehicle is capable of travelling up to 240 km/h.

The present disclosure relates to a control system and control method for determining, based on information (in particular, a maximum load and a maximum speed) on the tire 1 included in tire codes indicated on the tire 1, suitability of tires of a vehicle and limiting a travelling speed of the vehicle, and may be understood as being predetermined by the tire standards, as described above.

Hereinafter, in describing example embodiments of the present disclosure, the ETRTO standards corresponding to the ISO notation may be applied as the tire standards. However, the tire 1 according to example embodiments of the present disclosure is not limited to the tire 1 having tire codes indicated according to the ETRTO standards.

Figure 2:
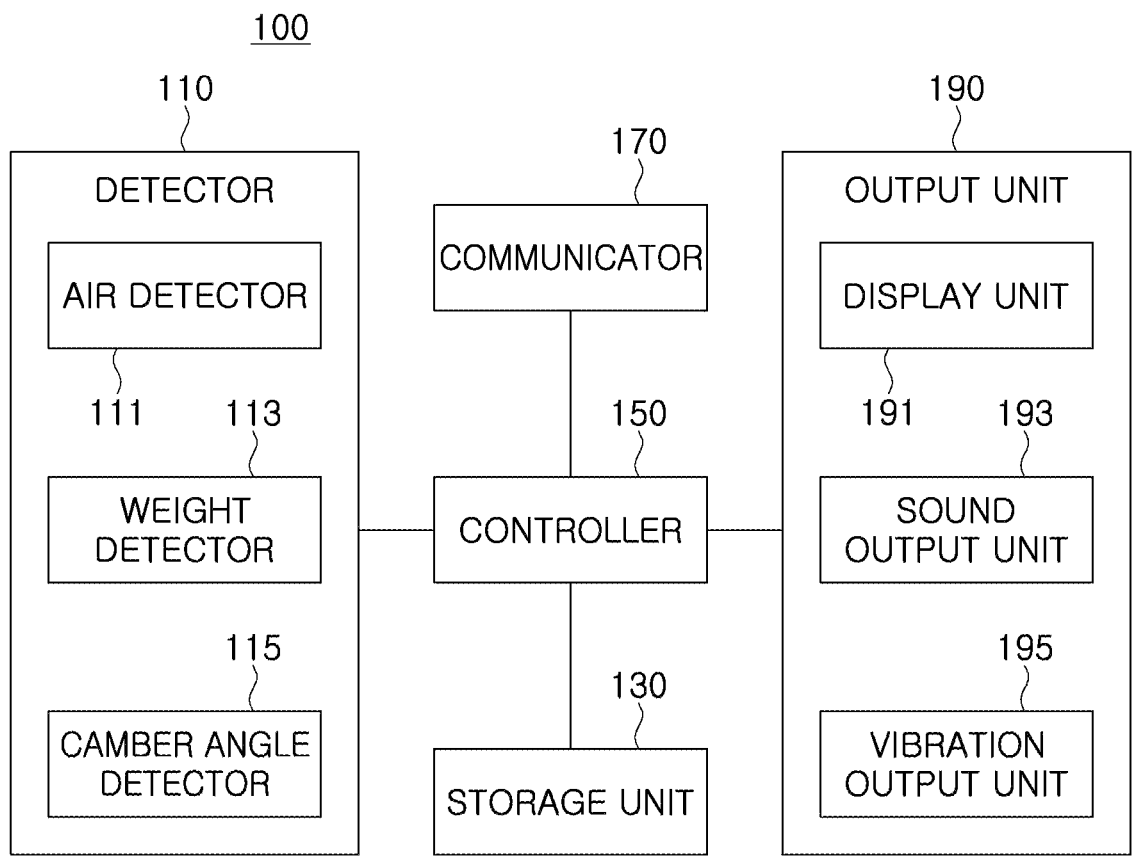
FIG. 2 is a block diagram illustrating a configuration of a vehicle control system based on tire codes according to an example embodiment of the present disclosure.

FIG. 2 is a block diagram illustrating a configuration of a vehicle control system 100 based on tire codes according to an example embodiment of the present disclosure.

Referring to FIG. 2, the vehicle control system 100 according to an example embodiment may control a vehicle, based on codes of a tire (for example, tire 1 in FIG. 1) mounted on the vehicle. The control system 100 may include a detector 110, a storage unit 130, a controller 150, a communicator 170, and an output unit 190.

The detector 110 may collect and/or detect state information on the vehicle. The detector 110 may collect and detect various pieces of information on a state of the vehicle, when the vehicle is stopped or travelling. For example, the detector 110 may collect and detect vehicle state information including vehicle weight, vehicle speed, tire pressure, and camber angle, and may transmit the detected vehicle state information to the controller 150. However, the vehicle state information is not limited to the above-described pieces of information, and may further include other pieces of information.

The detector 110 may include a pressure detector 111, a weight detector 113, and a camber angle detector 115.

The pressure detector 111 may detect or measure a pressure of the tire. The pressure detector 111 may include a pressure sensor. For example, the pressure detector 111 may be installed in a tire to measure a current pressure of the tire. The pressure detector 111 may measure a pressure of each of a plurality of tires mounted on the vehicle. The pressure detector 111 may include a tire pressure monitoring system (TPMS). The pressure detector 111 may transmit the measured pressure of the tire to the controller 150. For example, the pressure detector 111 may transmit the pressure of the tire to the controller 150 as an electrical signal.

The weight detector 113 may detect or measure a weight of the vehicle. The weight detector 113 may include a weight sensor. For example, the weight detector 113 may measure a complete vehicle curb weight (CVW), and may measure an increasing weight when a person rides in the vehicle or luggage is loaded. The weight detector 113 may transmit the measured weight of the vehicle to the controller 150. For example, the weight detector 113 may transmit the weight of the vehicle to the controller 150 as an electrical signal. Various methods known in the relevant technical field may be applied as a method by which the weight detector 113 detects the weight of the vehicle.

The camber angle detector 115 may detect or measure a camber angle of the tire. Here, the camber angle may refer to an angle at which a wheel, on which a tire is mounted, is tilted relative to a direction, perpendicular to the ground. The camber angle detector 115 may include an angle sensor detecting an angle change. The camber angle detector 115 may include an electronic stability control (ESC) system. The camber angle detector 115 may transmit the measured camber angle to the controller 150. For example, the camber angle detector 115 may transmit the camber angle of the tire to the controller 150 as an electrical signal.

The detector 110 may further include other sensors in addition to the pressure detector 111, the weight detector 113, and the camber angle detector 115. For example, the detector 110 may further include a wheel sensor and a speed sensor, but the present disclosure is not limited thereto.

The storage unit 130 may store various pieces of data related to the operation of the vehicle. The storage unit 130 may be implemented as at least one of a non-volatile memory device, such as cache, read only memory (ROM), programmable ROM (PROM), erasable programmable ROM (EPROM), electrically erasable programmable ROM (EEPROM), and flash memory, a volatile memory device such as random access memory (RAM), and a storage medium such as a hard disk drive (HDD) or CD-ROM, so as to store various pieces of information, but the present disclosure is not limited thereto.

The storage unit 130 may store tire code information. For example, the storage unit 130 may store tire code information input by a user. The user may transmit, to the vehicle, and store the tire code information using an external electronic device (for example, a smartphone), capable of communicating with the vehicle. For example, the user may recognize tire code information by tagging an RFID attached to a tire using a smartphone and may then transmit the tire code information to the vehicle via the communicator 170, and the transmitted tire code information may be stored in the storage unit. For another example, the user may capture an image of a tire code, indicated on the tire, using a camera device of the smartphone, may recognize tire code information, and may then transmit the tire code information to the vehicle via the communicator 170. However, a method of inputting and storing tire code information in a vehicle is not limited to the above-described method. In various example embodiments, the user may directly input a tire code after running an application linked to the vehicle on the smartphone.

The storage unit 130 may store a maximum travelling speed of the vehicle. For example, the storage unit 130 may accumulate and record a maximum speed reached while the vehicle is travelling, including a current travelling speed. The maximum travelling speed may be stored by monitoring speed of the currently travelling vehicle in real time. For example, when the speed of the currently travelling vehicle exceeds the previously stored maximum travelling speed, the current travelling speed may be updated to the maximum travelling speed.

The controller 150 may not only distribute signals to various devices installed in the vehicle, but also may respectively transmit control signals for internal devices of the vehicle to the devices. For example, the controller 600 may refer to an electronic control unit (ECU).

The controller 150 may include one or more processors and memory. The memory may store algorithm data or program for controlling the vehicle, and the processor may transmit a control signal for controlling various devices in the vehicle according to such a control algorithm. In addition, the processor may execute a program for operating the vehicle.

The controller 150 may determine suitability of the tires, based on at least one of state information on the vehicle received from the detector 110, tire code information stored in the storage unit 130, and a maximum travelling speed of the vehicle stored in the storage unit 130, and may limit a maximum possible travelling speed of the vehicle may be limited to a predetermined speed limit. The controller 150 may be set to calculate and detect pieces of information necessary for determining suitability of the tires and limiting a speed from the tire code information, input using the tire standards (for example, ETRTO standards).

The controller 150 may receive a signal including weight information on the vehicle from the weight detector 113. The controller 150 may receive a signal including tire pressure information from the pressure detector 111. The controller 150 may receive a signal including tire camber angle information from the camber angle detector 115. The controller 150 may obtain the tire code information and the maximum travelling speed of the vehicle, stored in the storage unit 130.

The controller 150 may determine suitability of the tires, based on a weight of the vehicle and a load index (LI) of the tire, and may limit a speed of the vehicle. The controller may detect an allowable load of the tire, based on the load index (LI) and the pressure of the tire of the tire code information. Here, the allowable load of the tire according to the load index (LI) and pressure may be determined according to a standard established by the ETRTO standards.

The controller 150 may compare the weight of the vehicle and the allowable load of the tire to each other. When the weight of the vehicle exceeds the allowable load of the tire, the controller 150 may limit a maximum possible travelling speed of the vehicle to a preset first speed limit. The controller 150 may provide, to a driver, information on excess of the allowable load and speed limiting via a display unit 191.

The controller 150 may limit the speed of the vehicle, based on the maximum travelling speed of the vehicle and a tire speed symbol (SS). The controller 150 may detect an allowable speed of the tire, based on the speed symbol (SS) of the tire code information. Here, the allowable speed of the tire according to the speed symbol (SS) may be determined according to the standard established by the ETRTO standards.

The controller 150 may compare the maximum travelling speed of the vehicle and the allowable speed of the tire to each other. When the maximum operating speed exceeds the allowable speed, the controller 150 may limit the maximum travelling speed of the vehicle to the allowable speed of the tire. The controller 150 may provide, to the driver, information on excess of the allowable speed and speed limiting via the display unit 191.

The controller 150 may provide information and perform speed limiting, when the previous maximum travelling speed stored in the storage unit 130 exceeds the allowable speed of the tire, regardless of the speed of the vehicle currently travelling. For example, in the case that the maximum travelling speed has exceeded the allowable speed of the tire, when the driver starts the vehicle, the controller 150 may guide, via the display unit 191, that the maximum travelling speed has exceeded the allowable speed of the tire, and accordingly the maximum possible travelling speed is limited to the allowable speed of the tire, even when the vehicle is not travelling.

The controller 150 may determine suitability of the tires, based on the tire code information, the pressure of the tire, and the camber angle, and may limit the vehicle speed. The controller 150 may calculate a minimum required pressure of the tire, based on the tire size information, the maximum travelling speed, the vehicle weight, and the camber angle. Here, a formula for calculating the minimum required pressure of the tire may be determined according to the standard established by the ETRTO standards, which will be described in more detail below with reference to FIG. 3.

The controller 150 may compare the pressure of the tire and the minimum required pressure to each other. When the pressure of the tire is less than the minimum required pressure, the controller 150 may limit maximum possible travelling speed of the vehicle to a second speed limit. The controller 150 may provide information on lack of minimum required pressure and speed limiting. Here, the second speed limit may be predetermined according to a range of the maximum travelling speed, or may be calculated using a formula for calculating the minimum required pressure, which will be described in more detail with reference to FIG. 3 below.

The controller 150 may perform an operation of comparing the maximum travelling speed of the vehicle and the allowable speed of the tire to each other and an operation of comparing the pressure of the tire and the minimum required pressure to each other. For example, when the maximum travelling speed exceeds the allowable speed of the tire and the pressure of the tire is less than the minimum required pressure, and thus the second speed limit is calculated, the controller 150 may limit the maximum possible travelling speed of the vehicle to a lower speed, among the allowable speed of the tire and the second speed limit.

The communicator 170 may perform internal communication of the vehicle and communication between the vehicle and an external device. The communicator 170 may include a hardware device implemented with various electronic circuits to transmit and receive signals via a wireless or wired connection. For example, the communicator 170 may include at least one of a short-range communication module, a wired communication module, and a wireless communication module. In the present disclosure, in-vehicle communication may be performed via controller area network (CAN) communication, local interconnect network (LIN) communication, Ethernet communication, or the like, but the present disclosure is not limited thereto.

The communicator 170 may receive state information on the vehicle from the detector 110 and transmit the state information to the controller 150. For example, the vehicle weight, the vehicle speed, the tire pressure, and the camber angle, collected and detected by the detector 110, may be transmitted to the controller 150 via CAN communication.

The output unit 190 may output guidance information, based on control of the controller 150. The output unit 190 may include a display unit 191 visually outputting information, a sound output unit 193 audibly outputting information, and a vibration output unit 195 physically outputting information. The display unit 191 may be implemented as a display device using a liquid crystal display (LCD) panel, a light-emitting diode (LED) panel, an organic light-emitting diode (OLED) panel, or a plasma display panel (PDP). For example, the display unit 191 may include displays of a cluster, an AVN device, or a head unit. The sound output unit 190 may be implemented using a speaker or a component outputting sound. The vibration output unit 195 may be implemented using a component outputting vibration to a steering wheel.

Figure 3:
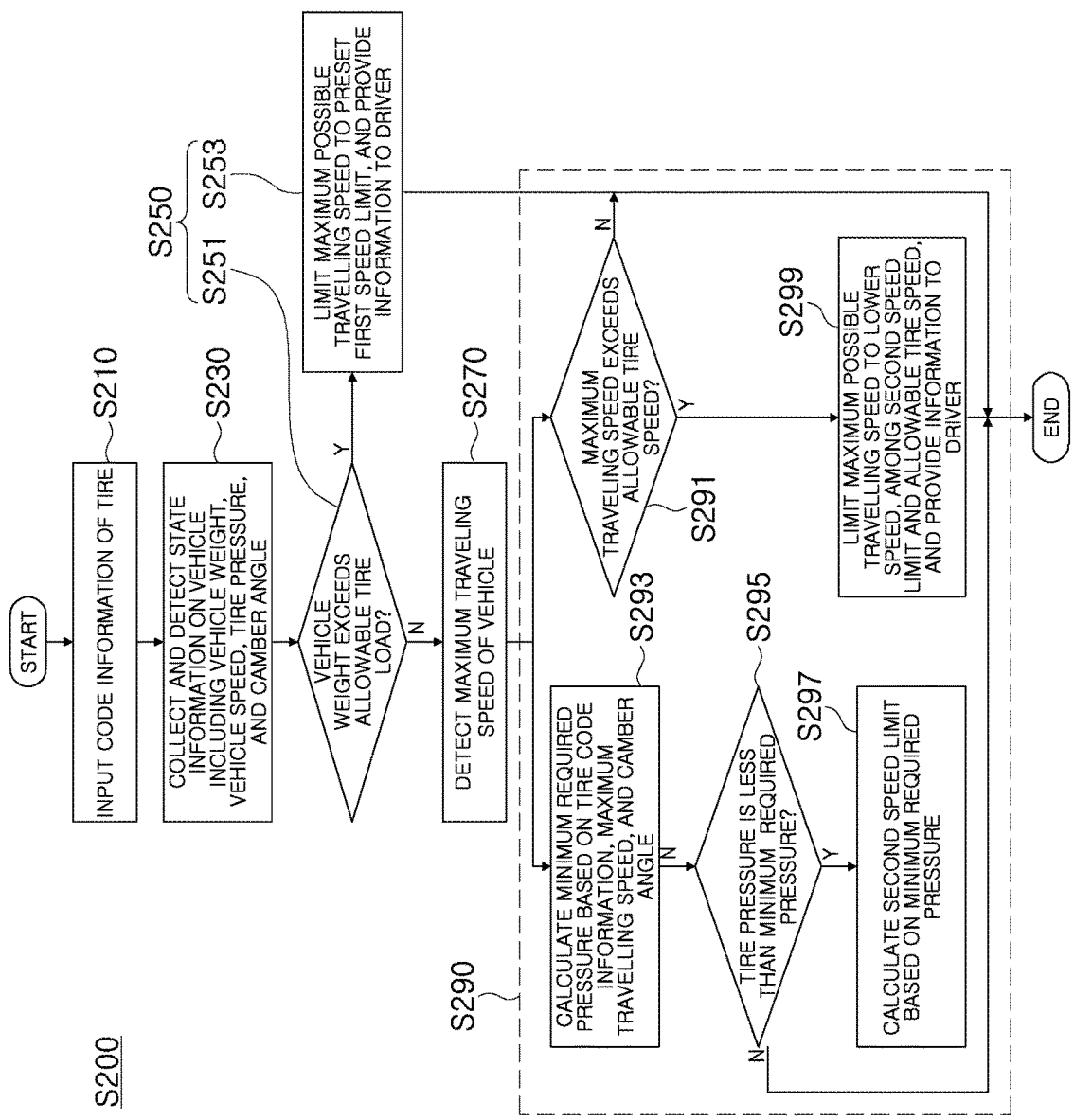
FIG. 3 is a flowchart illustrating a vehicle control method based on tire codes according to an example embodiment of the present disclosure.

FIG. 3 is a flowchart illustrating a vehicle control method (S200) based on tire codes according to an example embodiment of the present disclosure.

The vehicle control method (S200) according to an example embodiment of the present disclosure may be understood as being performed by at least some of components included in the vehicle control system 100 described with reference to FIG. 2. Accordingly, the description of the vehicle control system 100 of FIG. 2 may be equally applied to the vehicle control method (S200). Hereinafter, in describing FIG. 3, FIG. 2 will be referred to together, and a repeated description will be omitted.

Referring to FIG. 3, the vehicle control method (S200) according to an example embodiment may include inputting tire code information (S210), collecting and detecting state information on a vehicle (S230), controlling the vehicle, based on a load index of a tire code and a weight of the vehicle (S250), detecting a maximum travelling speed of the vehicle (S270), and controlling the vehicle, based on a speed symbol of the tire code and the maximum travelling speed (S290).

In the inputting the tire code information (S210), tire codes of a tire (for example, tire 1 in FIG. 1) mounted on the vehicle may be input to the vehicle by a driver. For example, the driver may transmit the tire codes, indicated on the tire, to the vehicle via an external terminal.

In the collecting and detecting the vehicle state information (S230), the detector 110 may collect and detect state information on the vehicle including a weight of the vehicle, a speed of the vehicle, a pressure of the tire, and a camber angle. The controller 150 may receive, from the detector 110, the weight of the vehicle, the speed of the vehicle, the pressure of the tire, and the camber angle.

In the controlling the vehicle, based on the load index of the tire codes and the weight of the vehicle (S250), the controller 150 may determine whether the weight of the vehicle exceeds an allowable tire load (S251). When the weight of the vehicle exceeds the allowable tire load, the controller 150 may limit the speed of the vehicle and provide information to the driver (S253).

The controller 150 may calculate an allowable tire load corresponding to the load index (LI) of the tire codes and the pressure of the tire, and may compare the allowable tire load to a current weight of the vehicle (S251). Here, the allowable tire load may be determined based on the load index (LI) and a current tire pressure via the ETRTO standards, and may be determined to correspond to the number of tires mounted on the vehicle. For example, when four tires are mounted on the vehicle, allowable loads may be respectively determined with respect to tires, and a value, obtained by summing the allowable loads, may be calculated as an allowable tire load, and the allowable tire load may be compared to a load of the vehicle.

The weight of the vehicle, exceeding the allowable tire load, may not be suitable for travelling, and thus the controller 150 may limit a maximum possible travelling speed of the vehicle to a first speed limit, and may guide the driver via the output unit 190 (S253). Here, the first speed limit may be preset according to a degree of the weight of the vehicle exceeding. For example, when the weight of the vehicle exceeds the allowable tire load by a critical range or more, it may be dangerous to travel in a current state, such that the first speed limit may be set as a speed at which the vehicle is capable of travelling for maintenance or stopping. According to various example embodiments, the first speed limit may be set according to a range in which the weight of the vehicle exceeds the allowable tire load, which will be described below with reference to FIG. 4.

The detecting the maximum travelling speed of the vehicle (S270) may be performed when the weight of the vehicle exceeds the allowable tire load. In the detecting the maximum travelling speed (S270), the controller 150 may detect the maximum travelling speed reached while the vehicle is traveling, based on a speed record stored in the storage unit 130.

In the controlling the vehicle, based on the speed symbol of the tire codes and the maximum travelling speed (S290), the controller 150 may determine suitability of the tires, based on various pieces of information including the maximum travelling speed of the vehicle and a speed symbol (SS) of the tire codes, and may limit the speed of the vehicle.

The controller 150 may determine whether the maximum travelling speed of the vehicle exceeds an allowable tire speed (S291). For example, the controller 150 may identify an allowable tire speed corresponding to the speed symbol (SS) of the tire codes, and may compare the allowable tire speed to the maximum travelling speed. Here, the allowable tire speed may be determined based on the speed symbol (SS) via the ETRTO standards.

The controller 150 may calculate a minimum required pressure of the tire, considering the camber angle, based on the tire code information, the maximum traveling speed, and the camber angle (S293). The controller 150 may calculate the minimum required pressure using at least some of Equations 1 to 4 below, based on the maximum travelling speed of the vehicle and the speed symbol (SS) of the tire.

$$P\_min = Pt \times Ks \times (Qr/Qt)^{\frac{1}{a}} \qquad \text{[Equation 1]}$$

$$P\_min = (Pt + A1 \times (V - A2)) \times Ks \times (Qr/Qt)^{\frac{1}{a}} \qquad \text{[Equation 2]}$$

-continued $$P\_min = (Pt + A3) \times Ks \times (Qr/Qv)^{\frac{1}{a}} \quad \text{[Equation 3]}$$

$$Qv = (1 - A4 \times (V - A5)) \times Qt \quad \text{[Equation 4]}$$

In Equations 1 to 4 above, "P_min" may represent a minimum required pressure, "Pt" may represent a reference pressure of a tire, "Ks" may represent a camber factor, "Qr" may represent a tire practical load, "Qt" may represent a tire reference load, "V" may represent a maximum travelling speed, and "a" may represent a pressure index. In addition, in Equations 1 to 4 above, "A1," "A2," "A3," "A4," and "A5" may be constants determined according to a range to which the maximum travelling speed belongs.

"Pt" may be determined based on tire codes. "Ks" may be determined based on a camber angle and tire codes. "Qr" may be calculated as a value obtained by dividing a load of a vehicle by the number of tires. "Qt" may be determined based on a load index (LI) and a reference pressure (Pt). Further, "a" may be determined based on tire codes. For example, the controller 150 may determine and/or calculate "Pt," "Ks," "Qt," and "a" according to the tire codes, indicated on the tire, using a mapping table predefined in the ETRTO standards.

Depending on the speed symbol (SS) of the tire and the range of maximum travelling speed, equations and constants applied to calculate a minimum required pressure (P_min) may be determined by Table 1 below. In Table 1 below, a speed, indicated with the speed symbol (SS), may represent an allowable tire speed according to each speed symbol (SS). For example, an allowable speed of a tire, having a speed symbol (SS) of V, may be 240 km/h. Here, Equations 1 to 4 and Table 1 may be specified by the ETRTO standards.

For another example, when the speed symbol (SS) of the tire is S and the maximum travelling speed (V) is 160 km/h or more, 0.5 may be applied for A1 and 160 may be applied for A2 using Equation 2 to calculate the minimum required pressure (P_min), and the minimum value of the minimum required pressure (P_min) may be specified as 180 kpa. That is, when the minimum required pressure (P_min) calculated using Equation 2 is less than 180 kpa, the minimum required pressure may be determined to be 180 kpa.

For another example, when the speed symbol (SS) of the tire is V and the maximum travelling speed (V) is 210 km/h or more, 30 may be applied for A3, 0.003 may be applied for A4, and 210 may be applied for A5 using Equation 3 and Equation 4 to calculate the minimum required pressure (P_min), and the minimum value of the minimum required pressure (P_min) may be specified as 180 kpa. That is, when the minimum required pressure (P_min) calculated using Equations 3 and 4 is less than 180 kpa, the minimum required pressure may be determined to be 180 kpa.

For another example, when the speed symbol (SS) of the tire is W and the maximum travelling speed (V) is 200 km/h, 1 may be applied for A1 and 190 may be applied for A2 using Equation 2 to calculate the minimum required pressure (P_min)), and the minimum value of the minimum required pressure (P_min) may be specified as 180 kpa. That is, when the minimum required pressure (P_min) calculated using Equation 2 is less than 180 kpa, the minimum required pressure may be determined to be 180 kpa.

The controller 150 may determine whether the pressure of the tire is less than the calculated minimum required pressure (S295). For example, the controller 150 may compare the pressure of the tire received from the pressure detector 111 to the minimum required pressure calculated in operation S293.

TABLE 1

| | Speed Symbol (SS) | | | | | |
|---|---|---|---|---|---|---|
| | S(180 km/h) | T(190 km/h) | H(210 km/h) | V(240 km/h) | W(270 km/h) | Y(300 km/h) |
| V < 160 km/h | Equation 1, Minimum P_min = 150 | | | | | |
| V ≥ 160 km/h | Equation 2<br>A1 = 0.5<br>A2 = 160 | Equation 2<br>A1 = 0.667<br>A2 = 160 | Equation 2<br>A1 = 0.6<br>A2 = 160 | Equation 2<br>A1 = 0.6<br>A2 = 160 | Equation 1<br>Minimum<br>P_min = 180 | Equation 1<br>Minimum<br>P_min = 180 |
| V ≥ 190 km/h | Minimum<br>P_min = 180 | Minimum<br>P_min = 180 | Minimum<br>P_min = 180 | Minimum<br>P_min = 180 | Equation 2<br>A1 = 1 | |
| V ≥ 210 km/h | | | | Equations 3<br>and 4 | A2 = 190<br>Minimum | |
| V ≥ 220 km/h | | | | A3 = 30<br>A4 = 0.003 | P_min = 180 | Equation 2<br>A1 = 0.6 |
| V ≥ 240 km/h | | | | A5 = 210<br>Minimum<br>P_min = 180 | Equations 3<br>and 4<br>A3 = 50 | A2 = 220<br>Minimum<br>P_min = 180 |
| V ≥ 270 km/h | | | | | A4 = 0.005<br>A5 = 240<br>Minimum<br>P_min = 180 | Equations 3<br>and 4<br>A3 = 50<br>A4 = 0.005<br>A5 = 270<br>Minimum<br>P_min = 180 |

For example, when a maximum travelling speed (V) is less than 160 km/h regardless of the speed symbol (SS) of the tire, the minimum required pressure (P_min) may be calculated using Equation 1, and a minimum value of the minimum required pressure (P_min) may be specified as 150 kpa. That is, when the minimum required pressure (P_min) calculated using Equation 1 is less than 150 kpa, the minimum required pressure may be determined to be 150 kpa.

When the pressure of the tire is less than the minimum required pressure, the controller 150 may calculate a second speed limit, based on the minimum required pressure (S297). For example, when the pressure of the tire is less than the minimum required pressure, it may be inappropriate for the vehicle to travel at a predetermined speed or higher, the controller 150 may calculate the second speed limit so as to limit the maximum travelling speed of the vehicle.

In operation S297, the second speed limit may be calculated according to an equation used to calculate the minimum required pressure. For example, when the minimum required pressure is calculated using Equation 1, the second speed limit may be determined as a predetermined speed. When the minimum required pressure is calculated using Equation 2, the second speed limit may be calculated by substituting a current tire pressure for P_min and inverting V in Equation 2. Similarly, when the minimum required pressure is calculated using Equations 3 and 4, the second speed limit may be calculated by substituting a current tire pressure for P_min and inverting V in Equations 3 and 4.

When the maximum travelling speed exceeds the allowable speed of the tire (determined in operation S295) and the pressure of the tire is less than the minimum required pressure (determined in operation S291), the controller 150 may limit a maximum possible travelling speed to a lower speed, among the second speed limit (calculated in operation S297) and the allowable speed of the tire, and may provide information to the driver (S299).

When the maximum travelling speed exceeds the allowable speed of the tire and the pressure of the tire is greater than or equal to the minimum required pressure, the controller 150 may limit the maximum travelling speed to the allowable speed of the tire, and may provide information to the driver.

In addition, when the pressure of the tire is less than the minimum required pressure and the maximum travelling speed is less than the allowable speed of the tire, the controller 150 may limit the maximum possible travelling speed to the second speed limit calculated in operation S297, and may provide information to the driver.

Figure 4:
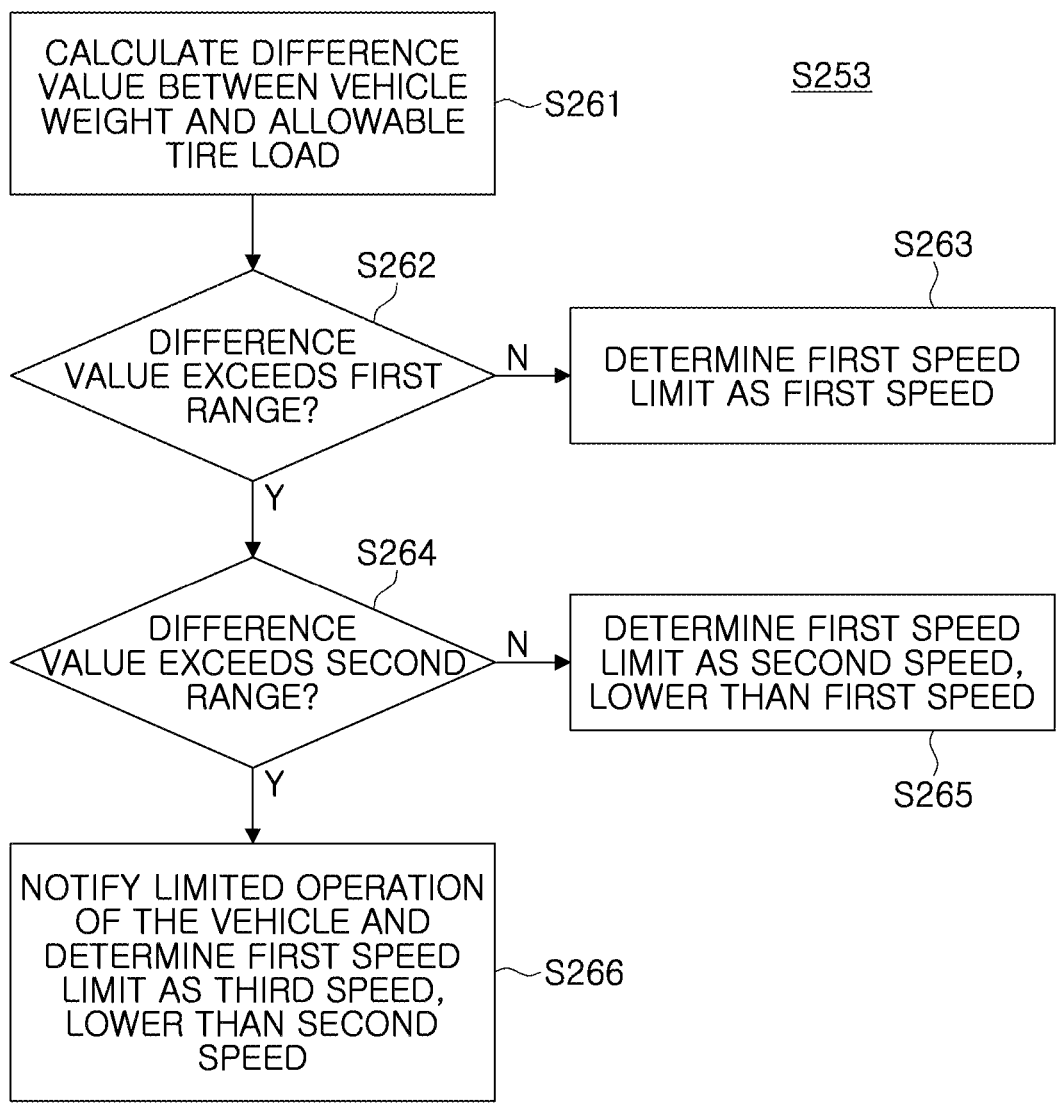
FIG. 4 is a flowchart illustrating operation S253 in greater detail of the vehicle control method illustrated in FIG. 3.

FIG. 4 is a specific flowchart illustrating operation S253 of the vehicle control method (S200) illustrated in FIG. 3.

Referring to FIG. 4, the vehicle control method (S200) according to an example embodiment may determine a first speed limit, based on a degree of a weight of a vehicle exceeding an allowable load of a tire.

When the weight of the vehicle exceeds the allowable load of the tire (determined in operation S251), the controller 150 may calculate a difference value between the weight of the vehicle and the allowable load of the tire (S261). For example, the controller 150 may calculate a degree of the weight of the vehicle exceeding the allowable load of the tire.

The controller 150 may determine whether the difference value between the weight of the vehicle and the allowable load of the tire exceeds a first range (S262). For example, the first range may be predetermined according to the vehicle, and the controller 150 may determine whether the difference value is within the first range.

The controller 150 may determine the first speed limit as a first speed when the difference value between the weight of the vehicle and the allowable load of the tire is within the first range (S263). The first speed may be predetermined according to the vehicle. For example, the first speed may be a predetermined speed at which travelling safety is secured when the weight of the vehicle exceeds the allowable load of the tire within the first range.

When the difference value between the weight of the vehicle and the allowable load of the tire exceeds the first range, the controller 150 may determine whether the difference value exceeds a second range (S264). Here, the second range may be greater than the first range. For example, the second range may be predetermined according to the vehicle, and the controller 150 may determine whether the difference value is within the second range.

When the difference value between the weight of the vehicle and the allowable load of the tire exceeds the first range, but is within the second range, the controller 150 may determine the first speed limit as a second speed, lower than the first speed (S265). The second speed may be predetermined according to the vehicle. For example, the second speed may be a predetermined speed at which travelling safety when the weight of the vehicle exceeds the allowable load of the tire within the second range.

When the difference value between the weight of the vehicle and the allowable load of the tire exceeds the second range, the controller 150 may provide a notification of a proposed operation of the vehicle and determine the first speed limit as a third speed, lower than the second speed (S266). For example, when the difference value between the weight of the vehicle and the allowable load of the tire exceeds the second range, it may be dangerous to travel in a current state, such that the third speed may be a predetermined speed at which the vehicle is capable of travelling for maintenance or stopping.

While example embodiments have been shown and described above, it will be apparent to those skilled in the art that modifications and variations could be made without departing from the scope of the present disclosure as defined by the appended claims.

In addition, in example embodiments of the present disclosure, some components may be deleted, and components of respective example embodiments may be combined with each other.

What is claimed is:

1. A vehicle control system for limiting a speed of a vehicle, the vehicle control system comprising:
   a storage unit configured to store tire code information including a load index and a speed symbol;
   a detector configured to collect and detect state information on the vehicle including vehicle weight, vehicle speed, tire pressure of tires of the vehicle, and camber angle; and
   a controller configured to determine, based on the tire code information stored in the storage unit and the state information detected by the detector, suitability of the tires, and to control a maximum possible travelling speed of the vehicle,
   wherein the storage unit is configured to accumulate and store a maximum travelling speed detected by the detector that is reached while the vehicle is travelling, and
   wherein the controller is configured to:
   calculate a minimum required pressure of the tires based on the tire code information, the maximum travelling speed, and the camber angle, and
   limit the maximum possible travelling speed of the vehicle based on a comparison between the tire pressure and the minimum required pressure.

2. The vehicle control system of claim 1, further comprising:
   an output unit configured to output control information by the controller,
   wherein the controller is configured to guide, via the output unit, a driver about a speed limit for the vehicle and that an operation of controlling the vehicle speed to the speed limit is performed.

3. The vehicle control system of claim 2, wherein the output unit includes at least one of a display unit, a sound output unit, and a vibration output unit.

4. The vehicle control system of claim 1, wherein the controller is configured to:

calculate, based on the load index and the tire pressure, an allowable load of the tires; and determine suitability of the tires by comparing the vehicle weight and the allowable load to each other.

5. The vehicle control system of claim 4, wherein the controller is configured to limit the maximum possible travelling speed of the vehicle limited to a preset first speed limit when the vehicle weight exceeds the allowable load, the preset first speed limit being determined based on a difference between the vehicle weight and the allowable load.

6. The vehicle control system of claim 4, wherein:
the controller is configured to calculate the allowable load by summing load information on each of the tires, and
the load information on each of the tires is determined based on the load index and the tire pressure of each of the tires.

7. The vehicle control system of claim 1, wherein:
the controller is configured to limit the maximum possible travelling speed of the vehicle to a predetermined speed, based on the speed symbol and the maximum travelling speed.

8. The vehicle control system of claim 7, wherein the controller is configured to:
calculate, based on the speed symbol, an allowable speed of the tires; and
limit the maximum possible travelling speed of the vehicle to the allowable speed of the tires when the maximum travelling speed exceeds the allowable speed.

9. The vehicle control system of claim 1, wherein the controller is configured to:
calculate, based on the minimum required pressure, a second speed limit; and
limit the maximum possible travelling speed of the vehicle to the calculated second speed limit when the tire pressure is less than the minimum required pressure.

10. The vehicle control system of claim 9, wherein the controller is configured to limit the maximum possible travelling speed of the vehicle to a lower speed, among the second speed limit and the allowable speed, when the maximum travelling speed exceeds the allowable speed of the tires calculated based on the speed symbol, and the tire pressure is less than the minimum required pressure.

11. The vehicle control system of claim 1, wherein the detector includes a weight detector configured to detect the vehicle weight, a pressure detector configured to detect the tire pressure, and a camber angle detector configured to detect the camber angle.

12. The vehicle control system of claim 11, wherein:
the pressure detector includes a tire pressure monitoring system (TPMS), and
the camber angle detector includes an electronic stability control (ESC) system.

13. The vehicle control system of claim 1, wherein:
the tire code information further includes a cross-sectional width, an aspect ratio, a structural symbol, and a rim outer diameter, and
the controller is configured to determine, based on at least one of pieces of information included in the tire code information and at least one of pieces of information included in the state information, suitability of the tires and to perform speed limiting of the vehicle.

14. The vehicle control system of claim 1, further comprising:

a communicator configured to perform internal communication of the vehicle and communication between the vehicle and an external device,
wherein the tire code information is input to the external device, and
the storage unit is configured to receive, from the external device, the tire code information via the communicator.

15. A vehicle comprising the vehicle control system of claim 1.

16. A vehicle control method for limiting a speed of a vehicle, the vehicle control method comprising:
inputting and storing, by a storage unit, tire code information including a load index and a speed symbol;
collecting and detecting, by a detector, state information on the vehicle including vehicle weight, vehicle speed, tire pressure of tires of the vehicle, and camber angle;
determining, by a controller based on the tire code information and the state information, suitability of the tires, and controlling a maximum possible travelling speed of the vehicle;
detecting, by the controller, a maximum travelling speed reached while the vehicle is travelling;
calculating, by the controller, a minimum required pressure of the tires based on the tire code information, the maximum travelling speed, and the camber angle, and
comparing, by the controller, the tire pressure and the minimum required pressure; and
limiting, by the controller, the maximum possible travelling speed of the vehicle when the tire pressure is less than the minimum required pressure.

17. The vehicle control method of claim 16, further comprising:
calculating, based on the load index and the tire pressure, an allowable load of the tires; and
comparing the vehicle weight and the allowable load to each other, and limiting the maximum possible travelling speed of the vehicle to a preset first speed limit when the vehicle weight exceeds the allowable load.

18. The vehicle control method of claim 17, further comprising:
calculating, based on the speed symbol, an allowable speed of the tires; and
comparing the maximum travelling speed and the allowable speed to each other, and limiting the maximum possible travelling speed of the vehicle to the allowable speed when the maximum travelling speed exceeds the allowable speed.

19. The vehicle control method of claim 17, further comprising:
calculating, based on the minimum required pressure, a second speed limit when the tire pressure is less than the minimum required pressure; and
limiting the maximum possible travelling speed of the vehicle to the calculated second speed limit.

20. A vehicle control system for limiting a speed of a vehicle, the vehicle control system comprising:
a memory configured to store tire code information including a load index and a speed symbol;
a sensor configured to collect and detect state information on the vehicle including vehicle weight, vehicle speed, tire pressure of tires of the vehicle, and camber angle; and
a controller configured to determine, based on the tire code information stored in the memory and the state information detected by the sensor, suitability of the tires, and to control a maximum possible travelling speed of the vehicle, wherein the memory is configured to accumulate and store a maximum travelling speed detected by the sensor that is reached while the vehicle is travelling, and wherein the controller is configured to:
- calculate a minimum required pressure of the tires based on the tire code information, the maximum travelling speed, and the camber angle, and
- limit the maximum possible travelling speed of the vehicle based on a comparison between the tire pressure and the minimum required pressure.

* * * * *